US007404677B2

(12) United States Patent
Klotmann et al.

(10) Patent No.: US 7,404,677 B2
(45) Date of Patent: Jul. 29, 2008

(54) FASTENING OF A RIDING RING TO THE CASING OF A ROTARY CYLINDER

(75) Inventors: Fred Klotmann, Köln (DE); Ralf Filges, Bergisch Gladbach (DE)

(73) Assignee: KHD Humboldt Wedag GmbH, Cologne (DE)

( * ) Notice: Subject to any disclaimer, the term of this patent is extended or adjusted under 35 U.S.C. 154(b) by 270 days.

(21) Appl. No.: 10/537,432

(22) PCT Filed: Nov. 26, 2003

(86) PCT No.: PCT/EP03/13269

§ 371 (c)(1), (2), (4) Date: Dec. 19, 2005

(87) PCT Pub. No.: WO2004/051100

PCT Pub. Date: Jun. 17, 2004

(65) Prior Publication Data

US 2006/0093252 A1 May 4, 2006

(30) Foreign Application Priority Data

Dec. 5, 2002 (DE) ................................ 102 56 758

(51) Int. Cl.
*F16C 13/00* (2006.01)

(52) U.S. Cl. ..................................................... 384/549

(58) Field of Classification Search ......... 384/557-560, 384/549, 584, 510; 415/134-136, 72; 403/28-30, 403/408; 432/103-104
See application file for complete search history.

(56) References Cited

U.S. PATENT DOCUMENTS 2,399,189 A * 4/1946 Johnson ...................... 384/549
2,449,198 A * 9/1948 Bernhard .................... 384/549
2,543,595 A * 2/1951 Patten ........................ 384/549
2,702,218 A 2/1955 Schoonover
3,860,303 A * 1/1975 Deussner .................... 384/549
4,552,508 A * 11/1985 Reid ........................... 415/72
5,044,786 A * 9/1991 Jacob et al. ................. 384/549

(Continued)

FOREIGN PATENT DOCUMENTS

DE 924077 2/1955

(Continued)

*Primary Examiner*—Marcus Charles
(74) *Attorney, Agent, or Firm*—Greer, Burns & Carin, Ltd

(57) ABSTRACT

A fastening arrangement between a riding ring and a casing of a rotary cylinder, whereby the riding ring encircles the casing of the rotary cylinder with clearance, including support elements affixed to the casing of the rotary cylinder and projecting radially outwardly. The riding ring has at least one circular groove on a surface thereof. A plurality of clamping elements are distributed around a perimeter of the riding ring, the distributed clamping elements engaging in a force-fit manner with the circular groove of the riding ring. The clamping elements are connected with the support elements, whereby the riding ring is immobilized in both the axial and circumferential directions relative to the casing of the rotary cylinder. The support elements affixed to the rotary cylinder casing have spring guides oriented axially relative to the rotary cylinder, between each of which is positioned a clamping element tensioned in a force-fit manner on the riding ring.

20 Claims, 4 Drawing Sheets

U.S. PATENT DOCUMENTS

| | | | | | |
|---|---|---|---|---|---|
| 5,087,133 | A | * | 2/1992 | Jacob et al. | 384/549 |
| 5,887,986 | A | * | 3/1999 | Pouliquen et al. | 384/549 |

FOREIGN PATENT DOCUMENTS

| | | | | |
|---|---|---|---|---|
| DE | 1222515 | | | 8/1966 |
| DE | 29 04 970 | | | 8/1980 |
| DE | 3203241 | | | 8/1983 |
| DE | 3801231 | | | 7/1989 |
| EP | 919736 | A1 | * | 6/1999 |
| GB | 936305 | | | 9/1963 |
| JP | 2000314592 | A | * | 11/2000 |

* cited by examiner

FASTENING OF A RIDING RING TO THE CASING OF A ROTARY CYLINDER

BACKGROUND OF THE INVENTION

The invention relates to a fastening of a riding ring on the casing of a rotary cylinder, in particular a rotary furnace for the heat treatment of free-flowing materials, in particular bulk solids such as raw cement mix, whereby the riding ring, which encircles the rotary casing with clearance, is locked in the axial direction and in the circumferential direction relative to the rotary cylinder via support elements affixed to the casing of the rotary cylinder.

There are mainly two different fastening types used to fasten riding rings to the casing of a rotary cylinder e.g. of a rotary furnace:

1. The so-called loose riding ring fastening (floating tire), known e.g. from DE-A-32 03 241. The riding ring is thereby not rigidly connected with the casing of the rotary cylinder but rather encircles the casing with radial play. On the riding ring station, the radial loads or forces from the furnace cylinder must be fed to the track rollers via the riding ring and to the baseplate via the bearing blocks. The riding ring is smooth on all sides and its axial movement is restricted by the retaining element fastened to the casing of the rotary cylinder. In the circumferential direction, the riding ring can move freely relative to the casing of the furnace and namely on washer plates, which are loosely inserted into the ring gap between the riding ring and the casing of the furnace, whereby any necessary corrections to the play of the riding ring can be made by switching out the washer plates. Ovalizations and other deformations of the casing of the rotary cylinder can be compensated for to a certain extent with this type of riding ring. However, the play of the riding ring and the relative movement of the riding ring must be constantly monitored using a measuring device for the safe and secure operation of this type of riding ring station.

2. The so-called fixed riding ring fastening (fixed tire), known e.g. from DE-A-38 01 231 as well as EP-B-0 765 459. The interior surface of the riding ring fastening known from the first document is provided with cogs like an inner toothed rim, and the riding ring is supported in the axial direction as well as in the circumferential direction on retaining elements welded to the casing of the rotary cylinder via these cogs as well as wedges and washer plates. The riding ring fastening known from the second document has through holes distributed around the perimeter, through which through bolts can be fed, the ends of which are affixed to retaining elements of the casing of the rotary cylinder so that, in this manner, the riding ring is fixed not only in the axial direction but also in the circumferential direction. It is understood that both the planing and shaping of the internal teeth of a riding ring as well as the boring of holes in the riding ring are very costly production steps. Add to this the fact that material sectional weakenings are caused by both the inner teeth as well as by the through holes of the known riding rings, which is why these known riding rings must be constructed to be relatively thick-walled, which in turn leads to higher costs.

SUMMARY OF THE INVENTION

The object of the invention is to create a fastening for a riding ring of a rotary cylinder, in particular a rotary furnace, whereby the riding ring, irrespective of its locking, can be immobilized in the axial direction as well as in its circumferential direction with respect to the casing of the rotary cylinder without the riding ring requiring complex machining like planing, shaping, and the creation of through holes, etc.

In the riding ring fastening according to the invention, the riding ring itself is manufactured as a pure turning work piece, i.e. the cast or forged riding ring only needs to be processed on a carousel lathe machine, which needs to be used anyway to finish the riding ring to the desired external diameter and inner diameter. Further machining like planing, shaping, boring, etc. is not required. With one and the same lathe machine, only circular grooves, in which clamping elements distributed around the perimeter are force fit, which on the other hand are connected with support elements affixed to the casing of the rotary cylinder and which lock the riding ring in both the axial direction and the circumferential direction, are turned into the riding ring, whereby, however, radial play is retained between the casing of the rotary cylinder and the interior surface of the riding ring and the inner surface of the riding ring for the incorporation of thermal expansions, deformations of the rotary cylinder, etc.

In accordance with another characteristic of the invention, the circular grooves of the riding ring are arranged on the interior surface of the riding ring and/or on at least one of the lateral surfaces of the riding ring as annular tensioning grooves, and the clamping elements can be designed as screw jaws, which engage with the tensioning groove on one hand and are fastened between the support elements of the casing of the rotary cylinder on the other hand and which each have a clamping screw. After the clamping screw is pulled, the screw jaw or the clamping element is force fit on the riding ring. The clamping elements or the clamping jaws are freely accessible, so that a retensioning or switching out of the clamping jaws can take place at any time. The clamping elements or the clamping jaws can be standard parts, which also fit for rotary-cylinder riding rings of different diameters. As a rule, the riding ring supports the casing of the rotary cylinder centrically via its clamping jaws, which are distributed around the perimeter and are force fit, whereby the riding ring no longer experiences relative movement with respect to the casing of the rotary cylinder. If necessary, e.g. in the case of non-round and/or arched rotary-cylinder casings, it is also possible to support the bearing ring eccentrically on the casing of the rotary cylinder via its clamping elements. In either case, play remains for the riding ring, which is fixed in the axial and circumferential directions, in the radial direction with respect to the rotary-cylinder casing. This play enables an unhindered expansion of the rotary-cylinder casing, e.g. during heating.

In accordance with another characteristic of the invention, the screw jaws of the clamping elements can be designed angularly, with an axial angular arm, the hook-shaped end of which engages with the circular groove arranged on the interior surface of the riding ring, while the radial angular arm supports the at least one clamping screw mentioned above, which engages with the circular groove arranged on the neighboring lateral surface of the riding ring and thus tensions the clamping element with the riding ring in a force-fitting manner.

But, the screw jaws of the clamping elements can also be designed like grippers or shears, whereby the jaws of the grippers or the ends of the shears can be clamped in the circular grooves of the lateral surfaces of the riding rings.

The invention and its further characteristics and advantages are described in greater detail using the exemplary embodiments illustrated schematically in the figur

DETAILED DESCRIPTION OF THE PREFERRED EMBODIMENT

Figure 1:
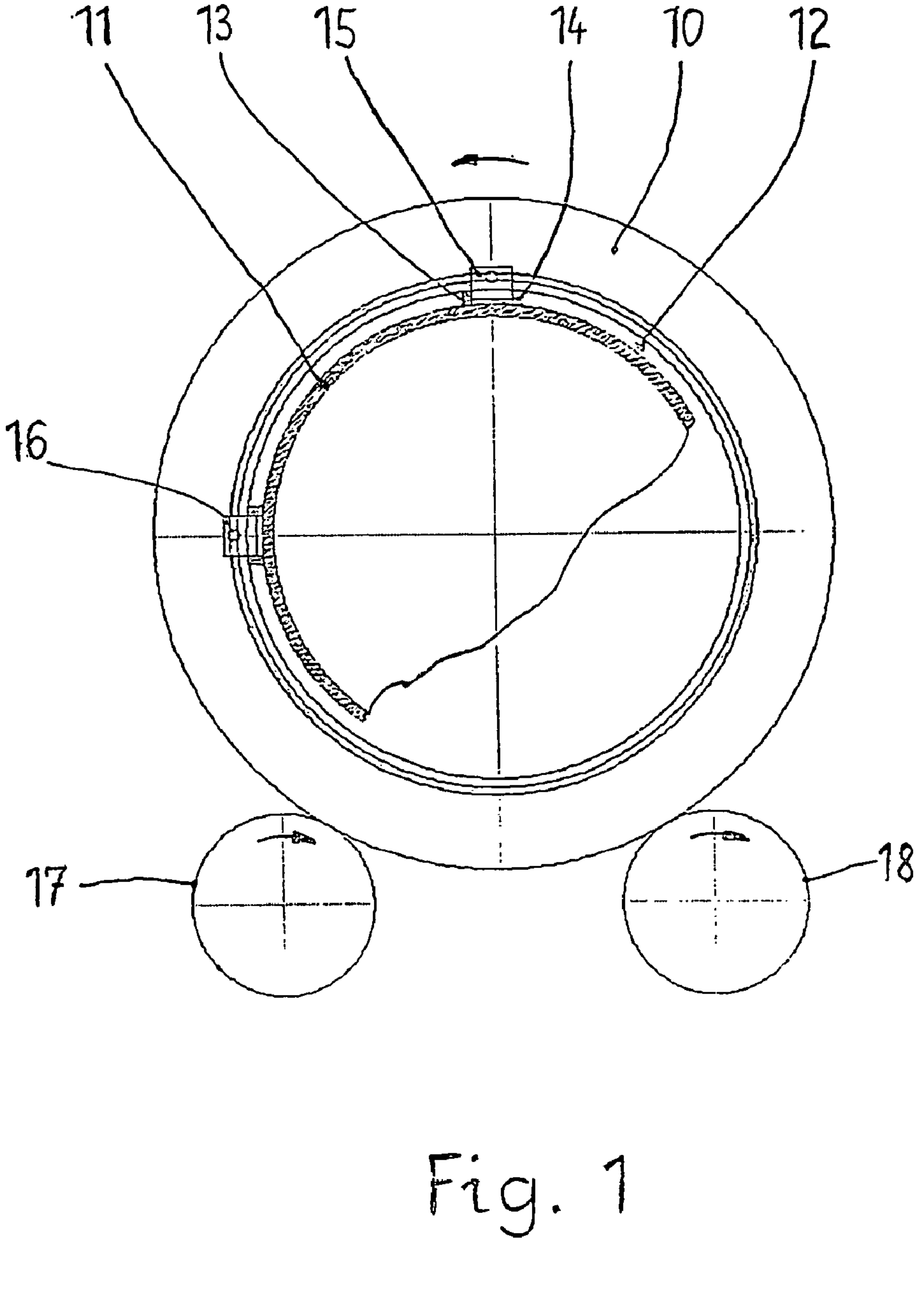
FIG. 1: A cross section of a rotary-cylinder casing with clamping elements distributed over the perimeter, which clamp a riding ring that is shown from the side on the rotary-cylinder casing.

FIG. 1 shows a lateral view of riding ring 10, which is fastened on the casing 11 of a rotary cylinder, e.g. of a rotary furnace. The riding ring 10 encircles the rotary-cylinder casing 11 with radial play 12, and it is clamped in the axial direction and in the circumferential direction relative to the rotary cylinder via support elements 13, 14, which are fastened on the rotary-cylinder casing 11 by means of the clamping elements 15, 16, etc. described below. On the bottom side, the riding ring 10 is mounted on two track roller stations 17 and 18. Despite the immobilization of the riding ring 10, the radial play 12 allows an unhindered expansion of the rotary-cylinder casing 11 through heating, deformations, etc.

The entire riding ring 10 is manufactured inexpensively as a turning work piece on a carousel lathe machine, i.e. the riding ring has no bore holes, cogs, etc. As can be seen in FIG. 1, clamping elements 15, 16, etc. are arranged around the perimeter of the riding ring 10; on one hand, they engage in a force-fit manner with the circular grooves (as can be seen in FIGS. 2 and 4 through 7) of the riding ring and on the other hand are connected with the support elements 13, 14, etc. fastened to the rotary-cylinder casing 11 and they immobilize the riding ring in both the axial and circumferential directions.

Figure 2:
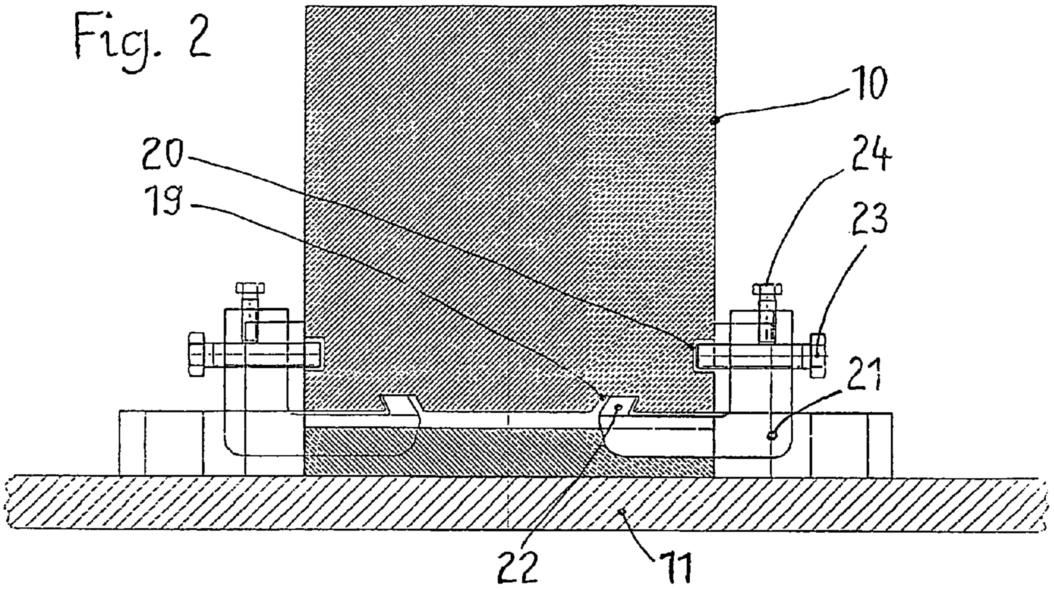
FIG. 2: A partial longitudinal section through the rotary-cylinder casing with a tensioned riding ring force-fit on it via clamping elements or screw jaws.
Figure 3:
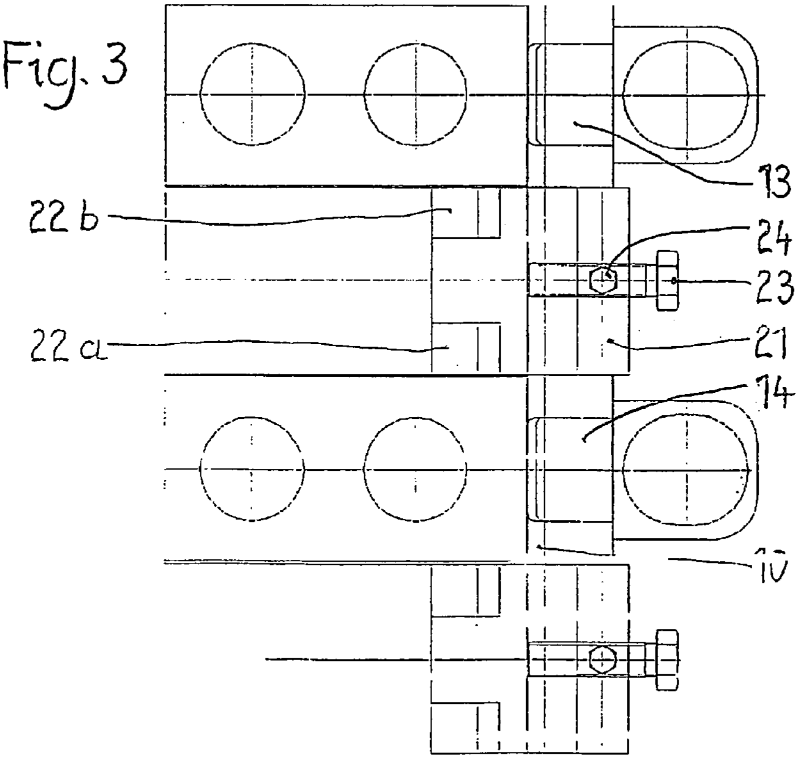
FIG. 3: A partial top view of the riding ring fastening.

As can be seen in FIG. 2, annular tensioning grooves 19, 20, with which screw jaws 21 of the clamping elements 15, 16 engage, are turned into the interior surface of the riding ring 10 and/or into at least one lateral surface of the riding ring, whereby each of these screw jaws are arranged between the support elements 13, 14 fastened on the rotary-cylinder casing 11, as can also be seen in FIGS. 1 and 3. The screw jaws 21 of the clamping elements distributed around the perimeter of the riding ring 10 are designed angularly, and the axial angular arm with a hook-shaped end 22 or ends 22*a* and 22*b* in accordance with the exemplary embodiment in FIG. 3 engages almost swallow-tail-like with the circular groove 19 arranged on the interior surface of the riding ring, while the radial angular arm supports at least one tensioning screw 23, which engages with the circular groove 20 arranged on the neighboring lateral side of the riding ring and which, after being pulled, tensions in a force-fit manner the screw jaws 21 of the clamping element with the riding ring 10. The clamping screw 23 can still be secured by a screw 24 screwed into the radial angular arm of the screw jaws.

As can be seen in the top view in FIG. 3, the tensioning between the clamping element designed like screw jaws 21 and the riding ring 10 can be advantageously designed as a symmetrical 3-point transfer of force with two spaced hooks 22*a*, 22*b* per angular screw jaw 21 arranged on the axial angular arm, which lie symmetrically opposite the clamping screw 23 arranged in the radial angular arm of the screw jaws.

Figure 4:
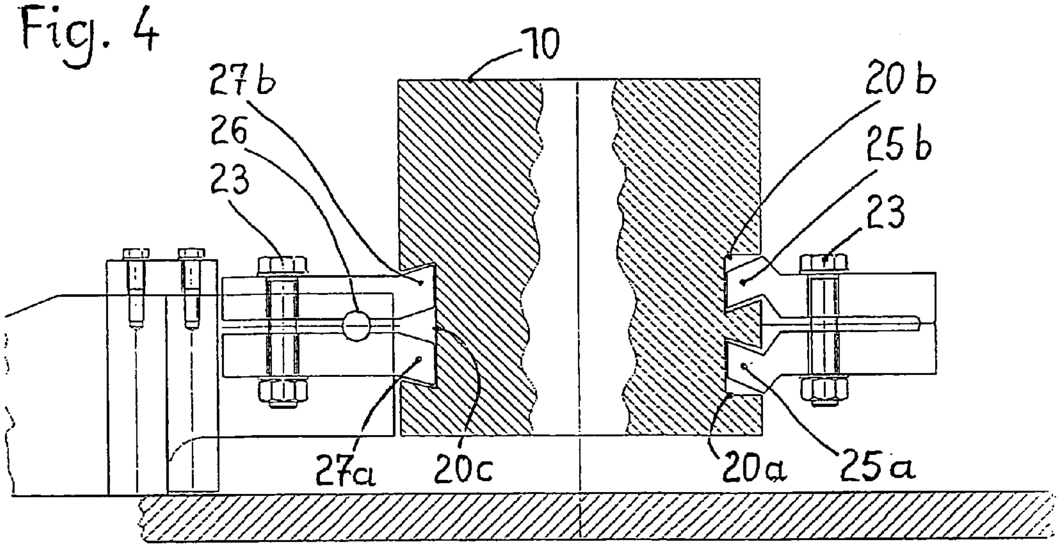
FIG. 4: As variants for FIG. 3, a riding ring fastening, in which the screw jaws of the clamping elements are designed like grippers on the right side of the riding ring and like shears on the left side of the riding ring.

In accordance with the exemplary embodiment in the right half of FIG. 4, the screw jaws of the clamping elements can be designed like grippers, the gripper jaws 25*a*, 25*b* of which engage with or clamp into two concentric circular grooves 20*a*, 20*b* in the lateral surfaces of the riding ring 10, if necessary with the help of undercuts. In accordance with the exemplary embodiment in the left half of FIG. 4, the screw jaws of the clamping elements can also be designed like shears, the shear ends 27*a*, 27*b* of which can be pivoted around the pivot point 26 and partially spread through openings or spreadings into an appropriately shaped circular groove 20*c* on the lateral surface of the riding ring 10. The clamping strength of the force-fit clamped joint is adjusted on the clamping screw 23.

Figure 5:
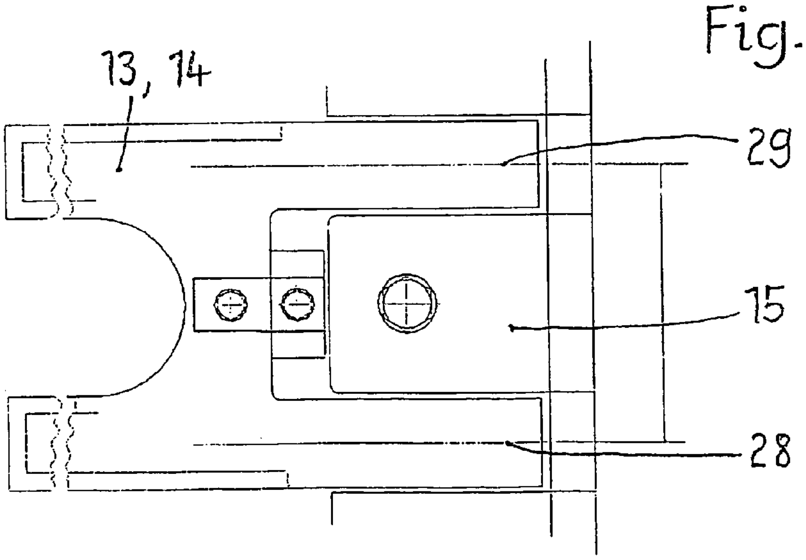
FIG. 5: A partial top view of the riding ring fastening or the support elements fastened on the rotary-cylinder casing, designed as spring guides.
Figure 6:
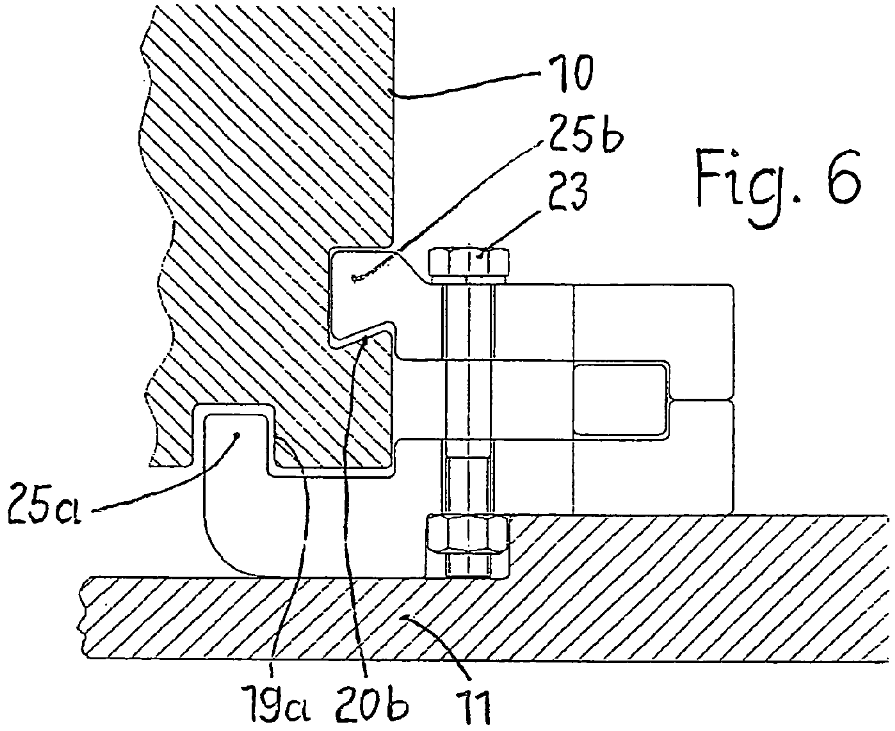
FIG. 6: As variants for FIGS. 2 and 4, another type of riding ring fastening.

The top view in FIG. 5 shows that the support elements 13, 14 for immobilizing the retaining ring 10 fastened on the rotary-cylinder casing 11 in the axial direction and in the circumferential direction can have spring guides 28, 29 lying axially relative to the rotary cylinder, between each of which is arranged a clamping element 15, 16, etc. tensioned in a force-fit manner on the riding ring 10. These spring guides 28, 29 act like a spring and enable an even more uniform transfer of force from the rotary-cylinder casing 11 to the riding ring 10 via the clamping elements 15, 16, etc. and from there to the baseplate via the track rollers 17, 18. The exemplary embodiment in FIG. 6 differs from the exemplary embodiment in the right half of FIG. 4 in that the gripping jaws of the screw jaws of the clamping elements engage around the corner on the riding ring 10; i.e. the gripping jaws 25*a* engage with circular groove 19*a* arranged on the interior surface of the riding ring and the gripping jaws 25*b* engage with a circular groove 20*b* arranged on the lateral surface on the riding ring.

Figure 7:
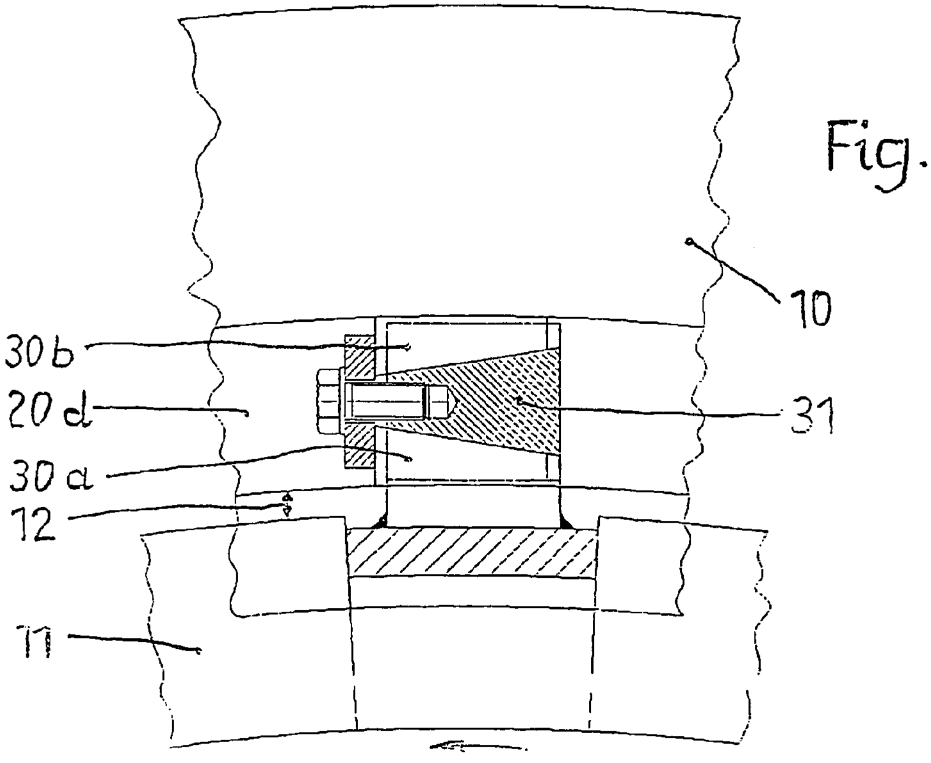
FIG. 7: The lateral view of a riding ring with a circular groove, into which clamping elements distributed over the perimeter with tapered force transfer surfaces are inserted.

In accordance with the exemplary embodiment in FIG. 7, wedge-shaped elements 30*a*, 30*b*, which engage with clamping elements 31 provided with appropriate wedge surfaces, can be inserted into the radial groove 20*d* in the lateral surface of the riding ring 10, whereby the clamped joint in this solution and thus the entire riding ring fastening are further reinforced as a result of the rotary-cylinder casing 11 set in motion in the direction of the arrow.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The invention claimed is:

1. A fastening arrangement between a riding ring and a casing of a rotary cylinder, whereby the riding ring encircles the casing of the rotary cylinder with clearance, comprising:

support elements affixed to the casing of the rotary cylinder and projecting radially outwardly, the riding ring having at least one circular groove on a surface thereof, a plurality of clamping elements distributed around a perimeter of the riding ring, the distributed clamping elements engaging in a force-fit manner with the circular groove of the riding ring, the clamping elements being connected with the support elements, whereby the riding ring is immobilized in both the axial and circumferential directions relative to the casing of the rotary cylinder, and wherein the support elements affixed to the rotary cylinder casing have spring guides oriented axially relative to the rotary cylinder, between each of which is positioned a clamping element tensioned in a force-fit manner on the riding ring.

2. A fastening arrangement according to claim 1, wherein the rotary cylinder is a rotary furnace for the heat treatment of free-flowing materials.

3. A fastening arrangement according to claim 2, wherein the free-flowing materials heat treated in the rotary furnace are bulk solids in the form of raw cement mix.

4. A fastening arrangement according to claim 1, wherein the riding ring is finished only on a lathe with no borings.

5. A fastening arrangement according to claim 1, wherein the at least one circular groove of the riding ring is arranged on at least one of an interior surface of the riding ring as a circumferential groove and one lateral surface of the riding ring as an annular groove, and the clamping elements include screw jaws which engage in the at least one circular groove.

6. A fastening arrangement according to claim 5, wherein the screw jaws of the clamping elements are formed as shears, shear ends of which can be spread apart against lateral surfaces of an appropriately shaped annular groove in the riding ring.

7. A fastening arrangement according to claim 5, wherein each of the clamping elements include a clamping screw for moving at least a portion of an associated screw jaw to tension the screw jaw in a force-fit manner on the riding ring.

8. A fastening arrangement according to claim 7, wherein the screw jaws of the clamping elements include wedge shaped elements, wherein rotation of the clamping screw causes the wedge shaped elements to move apart into force-fitting engagement with side walls of the circular groove.

9. A fastening arrangement between a riding ring and a casing of a rotary cylinder, whereby the riding ring encircles the casing of the rotary cylinder with clearance, comprising:

support elements affixed to the casing of the rotary cylinder and projecting radially outwardly, the riding ring having at least one circular groove on a surface thereof, a plurality of clamping elements distributed around a perimeter of the riding ring, the distributed clamping elements engaging in a force-fit manner with the circular groove of the riding ring, the clamping elements being connected with the support elements, whereby the riding ring is immobilized in both the axial and circumferential directions relative to the casing of the rotary cylinder, wherein the at least one circular groove of the riding ring is arranged on at least one of an interior surface of the riding ring as a circumferential groove and one lateral surface of the riding ring as an annular groove, and the clamping elements include screw jaws which engage in the at least one circular groove, and wherein the riding ring has two concentric annular grooves formed in a lateral face thereof and the screw jaws of the clamping elements are formed as grippers, with one of two gripping jaws of each screw jaw engaging in each of the two concentric grooves.

10. A fastening arrangement according to claim 9, wherein the riding ring is finished only on a lathe with no borings.

11. A fastening arrangement according to claim 9, wherein the screw jaws of the clamping elements are formed as shears, shear ends of which can be spread apart against lateral surfaces of an appropriately shaped annular groove in the riding ring.

12. A fastening arrangement according to claim 9, wherein each of the clamping elements include a clamping screw for moving at least a portion of an associated screw jaw to tension the screw jaw in a force-fit manner on the riding ring.

13. A fastening arrangement between a riding ring and a casing of a rotary cylinder, whereby the riding ring encircles the casing of the rotary cylinder with clearance, comprising:

support elements affixed to the casing of the rotary cylinder and projecting radially outwardly, the riding ring having at least one circular groove on a surface thereof, a plurality of clamping elements distributed around a perimeter of the riding ring, the distributed clamping elements engaging in a force-fit manner with the circular groove of the riding ring, the clamping elements being connected with the support elements, whereby the riding ring is immobilized in both the axial and circumferential directions relative to the casing of the rotary cylinder, wherein the at least one circular groove of the riding ring is arranged on at least one of an interior surface of the riding ring as a circumferential groove and one lateral surface of the riding ring as an annular groove, and the clamping elements include screw jaws which engage in the at least one circular groove, wherein each of the clamping elements include a clamping screw for moving at least a portion of an associated screw jaw to tension the screw jaw in a force-fit manner on the riding ring, and wherein the screw jaws of the clamping elements are formed angularly, with an axial arm having at least one hook-shaped end which engages with a circumferential groove arranged on an interior surface of the riding ring, and with a radial arm which supports at least one clamping screw, the clamping screw engaging with an annular groove arranged on a neighboring lateral surface of the riding ring, whereby the clamping screw tensions the screw jaw with the riding ring in a force-fit manner.

14. A fastening arrangement according to claim 13, wherein the tensioning between the screw jaw and the riding ring is formed as a symmetrical 3-point transfer of force with two spaced hook-shaped ends per angular screw jaw arranged on the axial arm, which arms lie symmetrically on opposite sides of the clamping screw.

15. A fastening arrangement according to claim 13, wherein the riding ring is finished only on a lathe with no borings.

16. A fastening arrangement between a riding ring which encircles a casing of a rotary cylinder, comprising:

a plurality of support elements affixed to the casing of the rotary cylinder and projecting radially outwardly, at least one circular groove formed in a surface of the riding ring, a plurality of clamping elements distributed around a perimeter of the riding ring and connected with the support elements such that the clamping elements are restrained against movement in axial and circumferential directions relative to the rotary cylinder by the support elements, the clamping elements further engaging in a force-fit manner with the circular groove of the riding ring, whereby the riding ring is immobilized in both the axial and circumferential directions relative to the casing of the rotary cylinder, wherein the clamping elements include screw jaws engaged in the circular groove, wherein the clamping elements include a clamping screw engaged with the screw jaws to move the screw jaws into force-fitting engagement with at least one side wall of the circular groove, and wherein each clamping element comprises two screw jaws movable away from each other to force-fittingly engage the at least one circular groove.

17. A fastening arrangement according to claim 16, wherein each clamping element comprises two screw jaws movable towards each other to force-fittingly engage the at least one circular groove.

18. A fastening arrangement according to claim 16, wherein the at least one circular groove comprises a circumferential groove formed on an inner surface of the riding ring and an annular groove formed on a lateral surface of the riding ring.

19. A fastening arrangement according to claim 16, wherein the at least one circular groove comprises two concentric annular grooves formed on a lateral surface of the riding ring.

20. A fastening arrangement according to claim 16, wherein the at least one circular groove comprises one annular groove formed on a lateral surface of the riding ring.

* * * * *